(12) United States Patent
Chin et al.

(10) Patent No.: US 10,250,320 B2
(45) Date of Patent: Apr. 2, 2019

(54) SATELLITE SIGNAL STRENGTH INDICATION AND REFLECTION DETECTION

(71) Applicant: Hughes Network Systems, LLC, Germantown, MD (US)

(72) Inventors: Michael G. Chin, San Diego, CA (US); Shijo Jose, San Diego, CA (US); Michael I. Parr, Solana Beach, CA (US); Juerg Widmer, San Diego, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/634,344

(22) Filed: Jun. 27, 2017

(65) Prior Publication Data

US 2018/0375571 A1    Dec. 27, 2018

(51) Int. Cl.
  *H04B 7/185*   (2006.01)
  *H04B 17/318*  (2015.01)
  *H04W 36/30*   (2009.01)

(52) U.S. Cl.
  CPC ..... *H04B 7/18541* (2013.01); *H04B 7/18536* (2013.01); *H04B 17/318* (2015.01); *H04W 36/30* (2013.01)

(58) Field of Classification Search
  CPC .............. H04B 7/18541; H04B 17/318; H04B 7/18536; H04W 36/30
  See application file for complete search history.

(56) References Cited

U.S. PATENT DOCUMENTS

| | | | | |
|---|---|---|---|---|
| 6,246,861 B1* | 6/2001 | Messier | ................ | G01S 5/0036 370/330 |
| 8,213,978 B1* | 7/2012 | Ho | ........................ | H04W 24/02 455/522 |
| 2007/0093995 A1* | 4/2007 | Mollenkopf | ........... | H04B 3/542 703/4 |
| 2007/0230555 A1* | 10/2007 | Peleg | ...................... | H04B 3/48 375/232 |
| 2008/0274690 A1* | 11/2008 | Laufer | ............... | H04B 7/18515 455/13.4 |
| 2014/0044097 A1* | 2/2014 | Chen | ..................... | H04W 36/24 370/331 |
| 2016/0050631 A1* | 2/2016 | Wen | ..................... | H04W 52/146 455/522 |
| 2016/0081073 A1* | 3/2016 | Lindoff | ............. | H04W 72/1257 370/329 |
| 2017/0288950 A1* | 10/2017 | Manson | .............. | H04L 41/0668 |

* cited by examiner

*Primary Examiner* — Dominic E Rego
(74) *Attorney, Agent, or Firm* — Bejin Bieneman PLC

(57) ABSTRACT

A telecommunications terminal includes a memory and a processor programmed to execute instructions stored in the memory. The instructions include determining an estimate of a link attenuation of a first communication link while receiving a channel and applying the estimate of the link attenuation to a second communication link after transitioning to the second communication link.

17 Claims, 3 Drawing Sheets

SATELLITE SIGNAL STRENGTH INDICATION AND REFLECTION DETECTION

BACKGROUND

In satellite communication systems, user terminals receive signals from satellites. Such user terminals often present a signal strength indicator (e.g., signal bars) to a user. The signal strength indicator represents, to the user, the quality of the signal received. Specifically, more signal bars indicate a higher signal strength.

DETAILED DESCRIPTION

Figure 1:
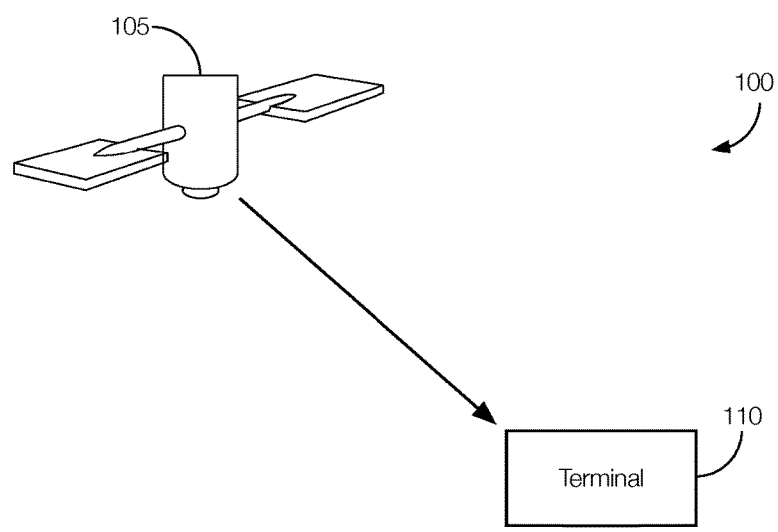
FIG. 1 illustrates an example satellite telecommunications system with a satellite in communication with a terminal at different times.

User terminals attempt to present a signal strength indicator according to the quality of the signal path between the terminal and the satellite. When the satellite downlink provides the terminal with a single signal, the terminal may estimate the quality of that signal and provide the appropriate indication. When the terminal can switch between many received signals, generating a dependable indication becomes challenging, especially if the signals received can have significantly different signal strengths. Thus, with no change to the terminal position and orientation, the displayed signal strength can vary significantly between bearers (i.e., communication links of different frequencies, bandwidth, modulation, and/or coding scheme). High variance of the signal quality indicator (SQI) and differences in transmission power per bearer at the satellite can also cause the displayed signal strength to vary significantly. This could also result in the satellite modem of the terminal receiving and tracking undesired reflected satellite signals, especially when a tracking antenna (e.g., vehicular) is involved since a tracking antenna may have increased antenna gain, which could lead to uncontrolled behavior.

One solution involves the terminal estimating link attenuation, which may be defined as the difference between the received power levels and the reference power levels, the levels when the terminal is directly pointed at the satellite with a clear line-of-sight. The estimates may be calibrated relative to a received signal strength indication (RSSI) metric of a reference bearer, which could be the selected broadcast channel (BCCH) bearer. Information about the broadcast channel characteristics may be temporarily stored. For instance, the broadcast channel characteristics may be stored in non-volatile memory so that it can be retained between power cycles.

Each time the terminal returns to a broadcast channel, the history information associated with that bearer should be applied. In other words, information derived from other bearers may be discarded. As the terminal transitions to other bearers, those new bearers may be used to keep track of the link attenuation. During the transition to new bearers, various approaches, discussed below, may be used to maintain stability of the link attenuation estimate.

One solution involves a telecommunications terminal with a memory and a processor programmed to execute instructions stored in the memory. The instructions include determining an estimate of a link attenuation of a first communication link while receiving a channel and applying the estimate of the link attenuation to a second communication link after transitioning to the second communication link.

The estimate of the link attenuation may be determined by determining a first maximum signal strength associated with the first communication link, measuring a first signal strength of a first signal transmitted over the first communication link, and estimating the link attenuation based at least in part on the first maximum signal strength and the first signal strength. A second maximum signal strength may be determined based at least in part on a second signal strength of a second signal transmitted over the second communication link and the link attenuation. The second maximum signal strength may be a sum of the second signal strength and the link attenuation. The instructions may further include estimating, based on the link attenuation, whether the first signal was reflected before being received at the telecommunications terminal. In this example approach, the instructions may include comparing the link attenuation to a threshold. Determining that the first signal was reflected may be a result of determining that the link attenuation exceeds the threshold. In some possible approaches, the instructions include detecting a handoff from the first communication link to the second communication link. In that instance, determining the second maximum signal strength may occur after detecting the handoff to the second communication link. Further, the instructions may include measuring the second signal strength after the handoff to the second communication link. In some possible implementations, the first maximum signal strength may be stored in the memory before measuring the first signal strength of the first signal.

An example method includes determining an estimate of a link attenuation of a first communication link while receiving a channel and applying the estimate of the link attenuation to a second communication link after changing to the second communication link. In the method, the estimate of the link attenuation may be determined by determining a first maximum signal strength associated with the first communication link, measuring a first signal strength of a first signal transmitted over the first communication link, and estimating the link attenuation based at least in part on the first maximum signal strength and the first signal strength. A second maximum signal strength may be determined based at least in part on a second signal strength of a second signal transmitted over the second communication link and the link attenuation. The second maximum signal strength may be a sum of the second signal strength and the link attenuation. The instructions may further include estimating, based on the link attenuation, whether the first signal was reflected before being received at the telecommunications terminal. In this example approach, the instructions may include comparing the link attenuation to a threshold. Determining that the first signal was reflected may be a result of determining that the link attenuation exceeds the threshold. In some possible approaches, the instructions include detecting a handoff from the first communication link to the second communication link. In that instance, determining the second maximum signal strength may occur after detecting the handoff to the second communication link. Further, the instructions may include measuring the second signal strength after the handoff to the second communication link. In some possible implementations, the first maximum signal strength may be stored in the memory before measuring the first signal strength of the first signal.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the telecommunication system 100 includes a satellite 105 in wireless communication with a terminal 110.

The satellite 105 may include any number of components, including antennas, computers, processors, memories, etc., that facilitate communication between a terrestrial transmitter and terrestrial receiver, either one of which could be the terminal 110. The satellite 105 may orbit the Earth. Examples of orbits may include a low earth orbit, a medium earth orbit, a geostationary orbit, or the like. The satellite 105 may include components that transmit signals in accordance with multiple beams. Each beam may be associated with a particular geographic region, especially if the satellite 105 is in geostationary orbit. Each beam may define a particular geographic region, and geographically adjacent beams may use different frequencies to, e.g., reduce interference. The satellite 105 may be programmed to communicate over different communication channels, referred to as a "first communication link" and a "second communication link" below.

The terminal 110 is implemented via circuits, chips, or other electronic components that can communicate with the satellite 105. The terminal 110 is programmed to receive signals from the satellite 105 via the first communication link, which could be a first communication channel or bearer. The terminal 110 may be programmed to determine the signal strength, such as the RSSI, of the first communication link. This signal strength, which may represent the actual signal strength of the first communication link at the time the signal strength is measured, may be referred to as the "first signal strength." The terminal 110 may be programmed to determine a maximum signal strength (max_RSSI) observed on the first communication link. This maximum signal strength may be referred to as the "first maximum signal strength." The first maximum signal strength may correspond to a direct line-of-sight from the terminal 110 to the satellite 105. The first maximum signal strength may be stored in, and accessed from, non-volatile memory. Therefore, the first maximum signal strength may have been observed prior to the measurement of the first signal strength.

The terminal 110 may be programmed to estimate link attenuation, which may be defined as the difference between the first maximum signal strength and the first signal strength. The terminal 110 may be programmed to estimate the link attenuation just prior to a handoff to a second communication link. As such, the link attenuation estimate may represent the shadow/attenuation experienced by the terminal 110 relative to the satellite 105 immediately before the handoff.

The link attenuation estimate can be used to determine the maximum signal strength of the second communication link. That is, the terminal 110 may be programmed to determine a new maximum signal strength, referred to as a "second maximum signal strength", after the handoff to the second communication link. The second maximum signal strength may be calculated, at least in part, from the first maximum signal strength measured relative to the first communication link. The terminal 110 may be programmed to determine the second maximum signal strength based on a signal strength (RSSI) measurement of the second communication link. The signal strength measurement of the second communication link may be referred to as the "second signal strength."

The terminal 110 may be further programmed to determine the second maximum signal strength from the first maximum signal strength assuming the channel did not significantly change. The terminal 110 may, for instance, be programmed to determine the second maximum signal strength from the second signal strength measured after the handoff to the second communication link. The terminal 110 may be programmed to calculate the second maximum signal strength as the sum of the link attenuation estimate and the second signal strength.

The terminal 110 may be further programmed to determine whether the signals from the satellite 105 are received directly (i.e., there is a clear line-of-sight from the satellite 105 to the terminal 110) or if the signals from the satellite 105 are the result of a reflection. The terminal 110 may be programmed to compare the link attenuation estimate to a predetermined threshold. The predetermined threshold may be stored in the non-volatile memory and may be based on the magnitude of the attenuation expected of a reflected signal. The terminal 110 may be programmed to determine that the signal from the satellite 105 is a reflected signal if the link attenuation estimate exceeds the predetermined threshold. The predetermined threshold may be on the order of, e.g., 15 dB depending on the type of terminal 110 involved.

Figure 2:
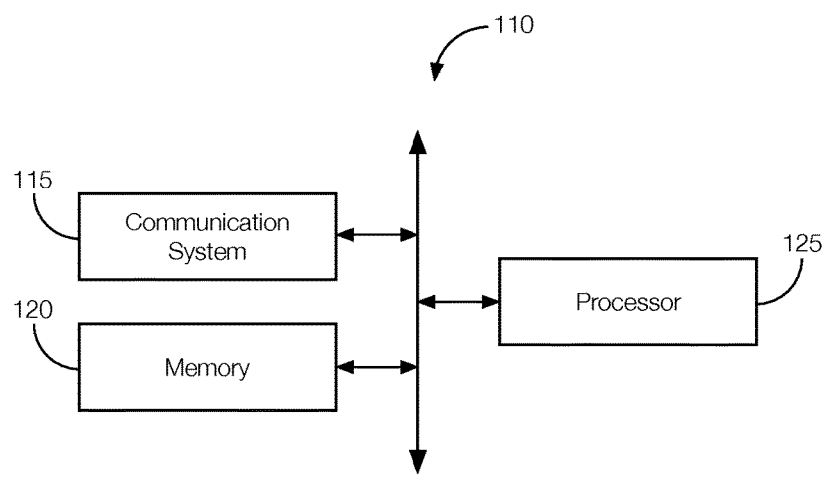
FIG. 2 is a block diagram illustrating example components of the terminal.

Referring now to FIG. 2, the terminal 110 may include components such as a communication system 115, a memory 120, and a processor 125.

The communication system 115 is implemented via an antenna, circuits, chips, or other electronic components that facilitate wireless communication between the terminal 110 and the satellite 105. Generally, the antenna of the communication system 115 is implemented via hardware that can receive and transmit radio waves. The antenna converts received radio waves into electrical signals. The antenna converts received electrical signals into radio waves. Electrical signals generated from received radio waves may be transmitted, from the antenna, to the processor 125. The electrical signals used by the antenna to generate radio waves may be received from the processor 125. The communication system 115 may be programmed to communicate in accordance with any number of wireless communication protocols. For instance, the communication system 115 may be programmed to communicate in accordance with a satellite-communication protocol, a cellular-based communication protocol (LTE, 3G, etc.), Bluetooth®, WiFi, etc.

The memory 120 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 120 may store instructions executable by the processor 125 and data such as the first maximum signal strength, the second maximum signal strength, the first signal strength, the second signal strength, the link attenuation estimate, the predetermined threshold, etc. The instructions and data stored in the memory 120 may be accessible to the processor 125 and possibly other components of the terminal 110.

The processor 125 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 125 can receive the signals from the antenna of the communication system 115 and data from the memory 120. The processor 125 can determine, from the signals received from the antenna of the communication system 115 and from the data stored in the memory 120, the second maximum signal strength. The processor 125 can also determine, from the signals received from the antenna of the communication system 115 and from the data stored in the memory 120, whether the signal received is reflected or from a direct line-of-sight with the satellite 105.

For example, the processor 125 may be programmed to receive signals, transmitted from the satellite 105 via the first communication link, which could be a first communication channel. The signals may be received by the antenna and forward to the processor 125 as electrical signals. The processor 125 may be programmed to determine the first signal strength, such as the RSSI, of the first communication link. The processor 125 may be programmed to determine the first maximum signal strength (max_RSSI) observed on the first communication link. The first maximum signal strength may correspond to a direct line-of-sight from the terminal 110 to the satellite 105. The first maximum signal strength may be stored in, and accessed by the processor 125 from, the memory 120. Therefore, the first maximum signal strength may have been observed prior to the measurement of the first signal strength.

The processor 125 may be programmed to estimate the link attenuation, which as discussed above may be defined as the difference between the first maximum signal strength and the first signal strength. The processor 125 may be programmed to estimate the link attenuation just prior to a handoff to the second communication link. As such, the link attenuation estimate may represent the shadow/attenuation experienced by the terminal 110 relative to the satellite 105 immediately before the handoff.

Further, as previously discussed, the link attenuation estimate can be used to determine the maximum signal strength of the second communication link. That is, the processor 125 may be programmed to determine the second maximum signal strength after the handoff to the second communication link. The processor 125 may be programmed to calculate the second maximum signal strength from, e.g., the first maximum signal strength measured relative to the first communication link. The processor 125 may be programmed to determine the second maximum signal strength based on the second signal strength, which is a signal strength (RSSI) measurement of the second communication link.

The processor 125 may be further programmed to determine the second maximum signal strength from the first maximum signal strength assuming the channel did not significantly change. The processor 125 may, for instance, be programmed to determine the second maximum signal strength from the second signal strength measured after the handoff to the second communication link. The processor 125 may be programmed to calculate the second maximum signal strength as the sum of the link attenuation estimate and the second signal strength.

The processor 125 may be further programmed to determine whether the signals from the satellite 105 are received directly (i.e., there is a clear line-of-sight from the satellite 105 to the terminal 110) or if the signals from the satellite 105 are the result of a reflection. The processor 125 may be programmed to compare the link attenuation estimate to the predetermined threshold stored in the memory 120. The processor 125 may be programmed to access the predetermined threshold from the memory 120 and determine that the signal from the satellite 105 is a reflected signal if the link attenuation estimate exceeds the predetermined threshold.

Figure 3:
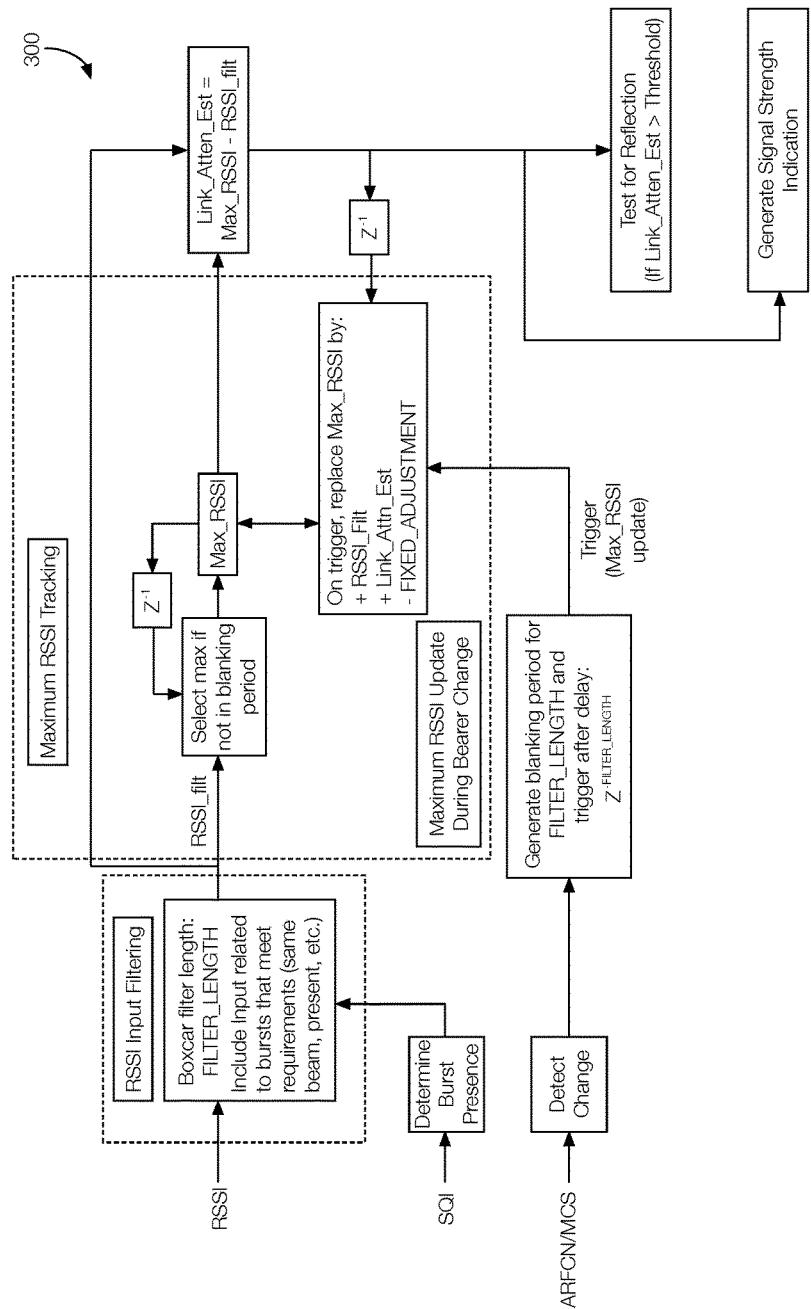
FIG. 3 is an example control diagram implemented by the terminal.

FIG. 3 illustrates an example control diagram 300 representing processing performed by the terminal 110. Specifically, the control diagram 300 represents how the processor 125 may determine the signal strength indication and whether the signal was reflected before arriving at the terminal 110.

The control diagram 300 may be executed for each burst on a communication link that is received by the terminal 110. Accordingly, an updated link attenuation estimate and subsequent reflection detection metric and signal strength indication may be calculated for each burst. The control diagram illustrates a three-stage process. The first stage involves "RSSI Input Filtering," which is followed by "Maximum RSSI Tracking". The estimations and output metrics are computed following the "Maximum RSSI Tracking." The inputs to the control diagram include burst metrics, RSSI and SQI, are used as inputs to the first stage, "RSSI Input filtering" and receive burst characteristics, specifically absolute radio frequency channel number (ARFCN) and modulation and coding scheme (MCS) are inputs to the second stage, "Maximum RSSI Tracking".

The RSSI input filtering is based on a finite impulse response (FIR) filter architecture, as this defines a specific filter delay, which can be used to define a convergence period following bearer transitions (i.e., transitions to the second communication link). Samples of the measured RSSI enter the "boxcar" filter as each burst is received. In that block, the filter determines the average of the RSSI values within its memory 120. The length of the filter (FILTER_LENGTH) may be configurable. Extending the length of the filter may reduce the responsiveness and may alter the accuracy of the algorithm.

The filter may further consider a confidence that a burst is coming from an intended beam. Specifically, the filter excludes the inclusion of burst metrics as input unless the confidence that the burst is coming from the intended beam or communication link is high. Bursts from co-channel beams that are included in the filtered stream can result in significant errors arising in the filter output, potentially resulting in run-away escalation of Max-RSSI calculations. To mitigate potentially inappropriate inputs in the filter, certain bursts may be omitted or limited. For instance, optional bursts (e.g., paging) may only enter the filter if the metrics indicate that the burst received is valid. Bursts that have cyclic redundancy check (CRC) failures may be omitted. Bursts declared "not present" (based on SQI, for instance) or bursts that fail correlation with known content in bursts may be excluded. RSSI input filtering may further include averaging the most recent FILTER_LENGTH bursts that meet requirements for entering the filter. Thus, other bursts may have no impact on the length of the filter. Further, power control related backoff of the received signals may be added to the input RSSI values.

Maximum RSSI tracking may occur as each burst is received except during a "blanking period" that follows each transition to a different communication link. Thus, except during the blanking period, the filtered RSSI estimate (RSSI_filt) may be checked for whether it exceeds the current estimate of Max_RSSI. If so, it replaces the current estimate. The Max_RSSI for a limited number of communication links may be recorded in a look-up table, Max_RSSI_LUT. In instances of unstable link conditions during changes to a different communication link where the filtered RSSI (RSSI_filt) value may be unreliable, a Max_RSSI value stored in Max_RSSI_LUT, if available, can be applied for the next communication link.

Communication link changes, sometimes called "bearer changes," may be defined as ARFCN changes. Other possibilities may be considered communication link changes. For instance, non-keep-alive burst MCS changes or bearer bandwidth (within MCS) changes may be considered communication link changes.

When a communication link change occurs, the value of Max_RSSI after the last burst received on the previous communication link (i.e., the first communication link) may be recorded, Max_RSSI_prev (i.e., the first maximum signal strength referred to above). The value of RSSI_filt after the last burst received on the previous communication link may be recorded, RSSI_filt_prev (i.e., the first signal strength previously discussed). The RSSI input filter may continue running until FILTER_LENGTH samples have been generated based on the next communication link input. At that time (i.e., when FILTER_LENGTH samples have been generated), the value of Max_RSSI may be updated as follows. If the next communication link (i.e., the second communication link) type is BCCH and if the history associated with this communication link is known, then Max_RSSI may be equal to Max_RSSI_BCCH_ref_prev (described below).

Otherwise, if the next communication link has a type other than BCCH, the following methodology may apply. Specifically, if the RSSI Input Filter takes a long time to converge (e.g. greater than 500 ms after the communication link change), in other words if FILTER_LENGTH samples are not available for a certain time period and if history for the next communication link is available in Max_RSSI_LUT, Max_RSSI may be based on the value of Max_RSSI_LUT for the next communication link stored in the look-up table, which may be stored in and accessed from the memory 120. Otherwise, if the RSSI Input Filter converges on time or if no history is known for the next communication link, then Max_RSSI may be calculated as Max_RSSI_prev plus RSSI_filt minus RSSI_filt_prev minus a fixed adjustment (shown as FIXED_ADJUSTMENT) in FIG. 3. In other words, in this circumstance, the second maximum signal strength is the first maximum signal strength plus the difference of the second signal strength minus the first signal strength minus the fixed adjustment. The fixed adjustment (FIXED_ADJUSTMENT) may be a small (possibly zero) offset. The fixed adjustment may account for possible changes in the channel during the blanking period (i.e., the time for the filter to converge on the second communication link)

If there is yet another communication link change (to, e.g., a third communication link) during the blanking period, the following methodology may apply. The values of Max_RSSI_prev and RSSI_filt_prev may be maintained. In other words, the first maximum signal strength and the first signal strength may not be affected by communication link changes during the blanking period. Moreover, the ARFCN associated with the Max_RSSI_prev may be recorded as ARFCN_Max_RSSI_prev. The filter may run until the third communication link supplies FILTER_LENGTH number of samples. If the third communication link ARFCN is the same as ARFCN_Max_RSSI_prev, the new Max_RSSI may be equal to Max_RSSI_prev. Otherwise, Max_RSSI can be updated as described above with respect to the transition to the second communication link. It may be possible that Max_RSSI can increase beyond an appropriate value after several communication link transitions. This can be limited by applying the FIXED_ ADJUSTMENT. In addition, the value of Max_RSSI may be limited to avoid unrealistic values.

The terminal 110 may further track the last-camped BCCH as part of the control diagram 300 of FIG. 3. That is, the terminal 110 may retain estimates based on the BCCH that was most recently used or that is currently in use. Specifically, the terminal 110 may define the default maximum RSSI (Max_RSSI_BCCH_ref default) to seed the tracking filter. The value for Max_RSSI_BCCH_ref default may be derived from empirical data. It may be different for each terminal type since each terminal 110 may have a different sensitivity, antenna gain, and RF chain gain. The terminal 110 may further determine the learned maximum RSSI (Max_RSSI_BCCH_ref_prev) for the last camped BCCH. The terminal 110 may also determine the last camped BCCH ARFCN corresponding to the learned maximum RSSI. This value may be referred to as BCCH_ARFCN_record_prev.

At power-up initialization, the terminal 110 retrieves the stored value of Max_RSSI_BCCH_ref default (depending on the terminal type) and uses that value to initialize Max_RSSI_BCCH_ref_prev. Thus, the stored value of Max_RSSI_BCCH_ref default is used as the basis for metric generation. During beam selection, the terminal 110 applies the standard tracking of RSSI_filt, which could raise the value of Max_RSSI_BCCH_ref_prev. The last received BCCH ARFCN may be recorded as the value for BCCH_ARFCN_record_prev and its associated Max_RSSI may be recorded as the value for Max_RSSI_BCCH_ref_prev.

After power-up initialization, the terminal 110 may determine if the ARFCN has changed. That is, the terminal 110 may compare the ARFCH to the BCCH_ARFCH_record_prev. If they match, the terminal 110 may set Max_RSSI to Max_RSSI_BCCH_ref_prev. Otherwise, the terminal 110 may set Max_RSSI to Max_RSSI_BCCH_ref default.

After determining whether the ARFCN has changed, the terminal 110 initiates on-going tracking. On-going tracking may include applying standard tracking of the RSSI_filt value, which could raise the value of Max_RSSI_BCCH_ref_prev. In some implementations, on-going tracking may involve monitoring SQI to determine when the terminal 110 is likely to experience line-of-sight operation (i.e., based on whether the RSSI is at the maximum value).

The terminal 110 may be further programmed to initialize the Max_RSSI value. The Max_RSSI value may be based on the empirical data derived for each terminal type. The values may vary depending on the system and beams used. That is, each communication link from the satellite 105 towards the terminal 110 may be transmitted with different power, such as equivalent isotropically radiated power (EIRP). The terminal 110 may include and access a look-up table stored in the memory 120 relating signal-to-noise ratios (Es/No) expected with line-of-sight operation for each terminal type and each beam type since there will be variation between terminals and system dependence. Not all RSSI values, however, can be directly derived from the look-up table since, e.g., they may depend on a specific design of the RF chain.

The terminal 110 may estimate link attenuation (Link_Atten_Est), which is an estimate of the propagation loss experienced during operation of the terminal 110. The link attenuation estimate may correspond to the difference of Max_RSSI and RSSI_filt. In this instance, RSSI_filt may be derived from a separate filter similar to that described above but with error-free optional bursts (e.g., paging) as input in addition to the other inputs mentioned above. During the blanking period, the link attenuation estimate value may be held constant so that it corresponds to the last burst of the "previous bearer."

The terminal 110 may be further programmed for reflection detection. This may be applicable to terminals with high gain directional tracking antennas, which can be prone to tracking undesired reflected satellite signals. In instances where the antenna is tracking a reflected signal, the terminal 110 may observe a significant increase in propagation loss as compared to when the antenna is tracking the direct line-of-sight satellite signal or signal reflection.

The terminal 110 may be programmed to detect reflection if, e.g., the link attenuation estimate exceeds a threshold. The threshold may be on the order of, e.g., 15 dB. In instances where the link attenuation estimate exceeds the threshold, the terminal 110 may command the tracking antenna to search for the line-of-sight direction to the satellite 105. The threshold may be based on various factors including the probability that the terminal 110 is looking at a showed line-of-sight signal, the probability that the terminal 110 is looking at a reflection, a combination of both, or possibly other factors. If the terminal 110 falsely concludes that it is looking at a reflection, the terminal 110 will attempt to relocate the line-of-sight signal, resulting in some delay but otherwise not resulting in serious system impairment. By using the link attenuation estimate, the terminal 110, therefore, can detect scenarios where the antenna is tracking a reflection or mis-pointed antenna and more quickly recover operational service.

The terminal 110 may be further programmed to generate a "percent signal strength metric." The percent signal strength metric may be generated as follows. A defined constant may set the expected maximum link attenuation supported by the terminal 110 (that is, according to the terminal type). For example, if the terminal 110 is a smartphone, the maximum link attenuation (MAX_LINK_ATTEN) may be on the order of 17 dB. The terminal 110 may be further programmed to implement filtering of the link attenuation estimate. The following example assumes a first order infinite impulse response (IIR) filter with a coefficient K. In this example, the link attenuation estimate may be initialized. That is, a value referred to as Link_Atten_Est_filt may be equal to the value Link_Atten_Est[n]. The ongoing filter may set Link_Atten_Est_filt[n] as shown in Equation 1.

$$\text{Link\_Atten\_Est\_filt}[n] = K \times \text{Link\_Atten\_Est}[n] + (1-K) \times \text{Link\_Atten\_Est\_filt}[n-1] \quad (1)$$

If K is equal to 1, then the terminal 110 will apply no additional filtering. Moreover, the value of K may vary according to bearer type.

The terminal 110 may be programmed to calculate the percentage signal strength based on the result of Equation 1. That is, the percentage signal strength may be defined as shown in Equation 2.

$$\text{MAX}(\text{MIN}((100 \times (\text{MAX\_LINK\_ATTEN} - \text{Link\_Atten\_Est\_filt})/\text{MAX\_LINK\_ATTEN}), 100), 0) \quad (2)$$

The MAX and MIN functions applied to the percentage signal strength in Equation 2 may limit the percentage signal strength calculation to values between and including 0 and 100.

Figure 4:
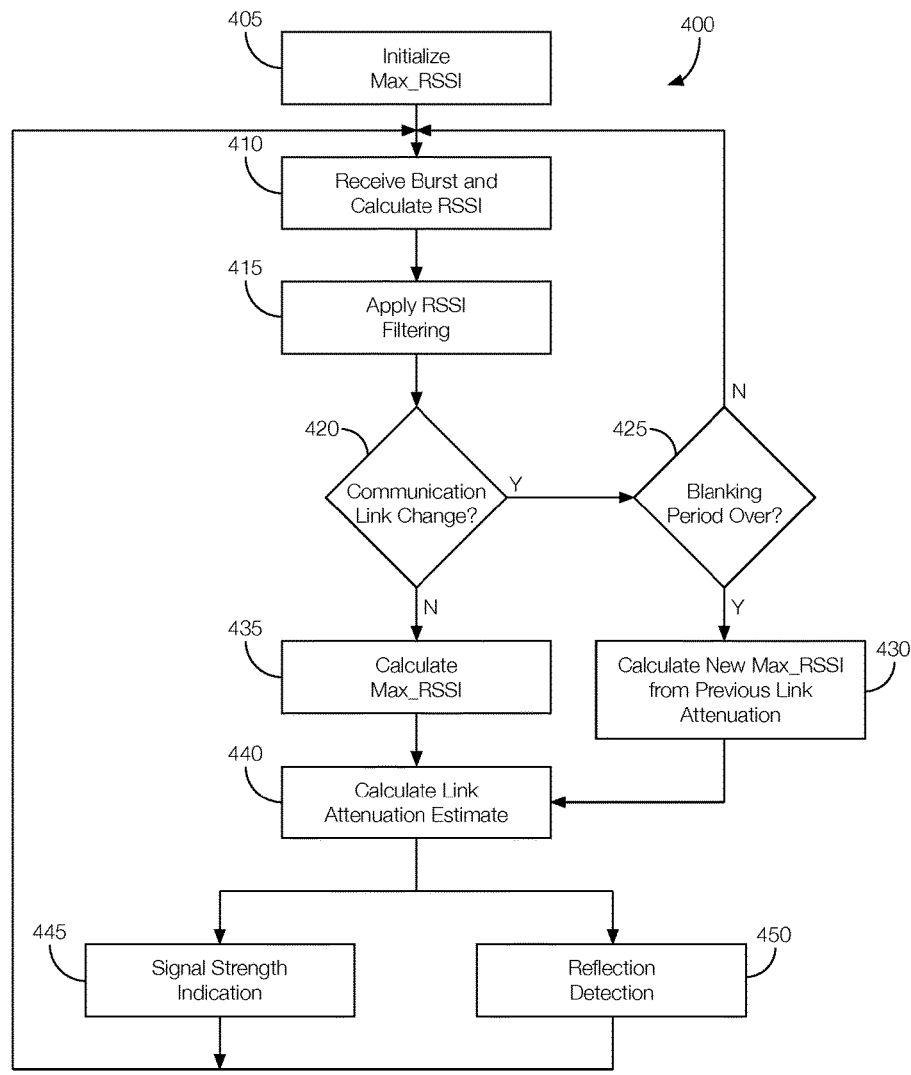
FIG. 4 is a flowchart of an example process that may be executed by the terminal.

FIG. 4 is a flowchart of an example process 400 that may be executed by the terminal 110. The process 400 may begin at any time and may continue to execute so long as the terminal 110 is operating.

At block 405, the terminal 110 initializes the value for Max_RSSI. The Max_RSSI value may be based on the empirical data derived for each terminal type. The values may vary depending on the system and beams used. That is, each communication link from satellite 105 may transmit at a different power, such as equivalent isotropically radiated power (EIRP). The terminal 110 may include and access a look-up table stored in the memory 120 relating signal-to-noise ratios (Es/No) expected with line-of-sight operation for each terminal type and each beam type since there will be variation between terminals and system dependence. Not all RSSI values, however, can be directly derived from the look-up table since, e.g., they may depend on a specific design of the RF chain.

At block 410, the terminal 110 receives a burst and calculate the signal strength of the burst. During a first iteration of the process 400, the signal strength may represent the actual signal strength of the first communication link at the time the signal strength is measured. This signal strength, as discussed above, may be referred to as the "first signal strength." During subsequent iterations of the process 400, the signal strength may represent the actual signal strength of the second communication link at the time the signal strength is measured. This signature strength, as discussed above, may be referred to as the "second signal strength."

At block 415, the terminal 110 applies RSSI filtering. As discussed above, the RSSI input filtering is based on a finite impulse response (FIR) filter architecture, as this defines a specific filter delay, which can be used to define a convergence period following bearer transitions (i.e., transitions to the second communication link). As shown in FIG. 3, samples of the measured RSSI enter the "boxcar" filter as each burst is received. The filter determines the average of the RSSI values within its memory 120. The length of the filter (FILTER_LENGTH) may be configurable. Extending the length of the filter may reduce the responsiveness and may alter the accuracy of the algorithm.

At decision block 420, the terminal 110 determines whether the communication link has changed. If so, the process 400 proceeds to block 425. Otherwise, the process 400 proceeds to block 435.

At block 425, the terminal 110 determines whether the blanking period is over. The processor 125 may make such a determination. Moreover, during the blanking period, the link attenuation estimate value may be held constant so that it corresponds to the last burst of the "previous bearer." If the blanking period is over, the process 400 proceeds to block 430. Otherwise, the process 400 returns to block 410.

At block 430, the terminal 110 calculates a new Max_RSSI (e.g., the "second maximum signal strength") from the link attenuation estimated from previous iterations of the process 400 (see, e.g., block 440) and the signal strength measured at block 410, which may be the "second signal strength" during subsequent iterations of the process 400. Thus, the processor 125 may apply the previous link attenuation estimate after changing to the second communication link. The process 400 may proceed to block 440 so the link attenuation estimate may be updated.

At block 435, the terminal 110 calculates Max_RSSI observed on the first communication link. As discussed above, the maximum signal strength may be referred to as the "first maximum signal strength." The first maximum signal strength may correspond to a direct line-of-sight from the terminal 110 to the satellite 105. The first maximum signal strength may be stored in the memory 120 and accessed by the processor 125. Therefore, the first maximum signal strength may have been observed prior to the measurement of the first signal strength.

At block 440, the terminal 110 estimates the link attenuation. That is, the terminal 110 may estimate link attenuation (Link_Atten_Est), which is an estimate of the propagation loss experienced during operation of the terminal 110. The link attenuation estimate may correspond to the difference of Max_RSSI and RSSI_filt. In this instance, RSSI_filt may be derived from a separate filter similar to that described above but with error-free optional bursts (e.g., paging) as input in addition to the other inputs mentioned above. In other words, the processor 125 may estimate the link attenuation according to the difference between the first maximum signal strength and the first signal strength or the second maximum signal strength and the second signal strength, depending on whether block 440 is reached during an initial or subsequent iteration of the process 400.

At block 445, the terminal 110 outputs a signal strength indication for the first communication link or the second communication link depending on whether block 445 is reached during an initial or subsequent iterations of the process 400. The processor 125 may be programmed to calculate the maximum signal strength from the measured signal strength and the link attenuation estimated at block 440. The process 400 may return to block 410 so the maximum signal strength, link attenuation estimate, or both, can be periodically reevaluated as new handoffs occur.

At block 450, the terminal 110 determines whether the signals from the satellite 105 are received directly (i.e., there is a clear line-of-sight from the satellite 105 to the terminal 110) or if the signals from the satellite 105 are the result of a reflection and output a signal indicating as much. The processor 125 may be programmed to compare the link attenuation estimate to a predetermined threshold. The predetermined threshold may be stored in the memory 120 and may be based on the magnitude of the attenuation expected of a reflected signal. The processor 125 may be programmed to determine that the signal from the satellite 105 is a reflected signal if the link attenuation estimate exceeds the predetermined threshold. The predetermined threshold may be on the order of, e.g., 15 dB depending on the type of terminal 110 involved. The process 400 may return to block 410 so the maximum signal strength, link attenuation estimate, or both, can be periodically reevaluated as new handoffs occur.

In general, the computing systems and/or devices, including the satellite 105 and the terminal 110, described may employ any of a number of computer operating systems, including, but by no means limited to, versions and/or varieties of embedded operating systems such as the Wind River VxWorks® operating system, the Express Logic ThreadX® operating system, the RTXC Quadros® operating system, and the Green Hills Software Integrity® operating system, or other operating systems such as the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Javascript, Perl, Python, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated there-with (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A telecommunications terminal comprising:
a memory; and
a processor programmed to execute instructions stored in the memory, the instructions including:
determining an estimate of a link attenuation of a first communication link while receiving a channel; and
applying the estimate of the link attenuation to a second communication link after transitioning to the second communication link,
wherein the estimate of the link attenuation is determined by determining a first maximum signal strength associated with the first communication link, measuring a first signal strength of a first signal transmitted over the first communication link, and estimating the link attenuation based at least in part on the first maximum signal strength and the first signal strength.

2. The telecommunications terminal of claim 1, wherein a second maximum signal strength is determined based at least in part on a second signal strength of a second signal transmitted over the second communication link and the link attenuation.

3. The telecommunications terminal of claim 1, wherein the second maximum signal strength is a sum of the second signal strength and the link attenuation.

4. The telecommunications terminal of claim 1, wherein the instructions include estimating, based on the link attenuation, whether the first signal was reflected before being received at the telecommunications terminal.

5. The telecommunications terminal of claim 1, wherein the instructions include comparing the link attenuation to a threshold.

6. The telecommunications terminal of claim 5, wherein the instructions include determining that the first signal was reflected as a result of determining that the link attenuation exceeds the threshold.

7. The telecommunications terminal of claim 1, wherein the instructions include detecting a handoff from the first communication link to the second communication link.

8. The telecommunications terminal of claim 7, wherein determining the second maximum signal strength occurs after detecting the handoff to the second communication link.

9. The telecommunications terminal of claim 7, wherein the instructions include measuring the second signal strength after the handoff to the second communication link.

10. The telecommunications terminal of claim 1, wherein the first maximum signal strength is stored in the memory before measuring the first signal strength of the first signal.

11. A method comprising:
determining an estimate of a link attenuation of a first communication link while receiving a channel, wherein the estimate of the link attenuation is determined by determining a first maximum signal strength associated with the first communication link, measuring a first signal strength of a first signal transmitted over the first communication link, and estimating the link attenuation based at least in part on the first maximum signal strength and the first signal strength; and
applying the estimate of the link attenuation to a second communication link after transitioning to the second communication link.

12. The method of claim 11, wherein a second maximum signal strength is determined based at least in part on a second signal strength of a second signal transmitted over the second communication link and the link attenuation.

13. The method of claim 11, wherein the second maximum signal strength is a sum of the second signal strength and the link attenuation.

14. The method of claim 11, wherein the instructions include estimating, based on the link attenuation, whether the first signal was reflected before being received at a telecommunications terminal.

15. The method of claim 11, wherein the instructions include:
comparing the link attenuation to a threshold; and
determining that the first signal was reflected as a result of determining that the link attenuation exceeds the threshold.

16. The method of claim 11, wherein the instructions include detecting a handoff from the first communication link to the second communication link, wherein determining the second maximum signal strength and measuring the second signal strength occur after detecting the handoff to the second communication link.

17. A telecommunications system comprising:
a satellite; and
a terminal in communication with the satellite, wherein the terminal is programmed to determine an estimate of a link attenuation of a first communication link while receiving a channel and apply the estimate of the link attenuation to a second communication link after transitioning to the second communication link,
wherein terminal is programmed to determine the estimate of the link attenuation by determining a first maximum signal strength associated with the first communication link, measuring a first signal strength of a first signal transmitted over the first communication link, and estimating the link attenuation based at least in part on the first maximum signal strength and the first signal strength.

* * * * *